United States Patent
Zettier

(10) Patent No.: US 6,468,574 B1
(45) Date of Patent: Oct. 22, 2002

(54) METHOD AND DEVICE FOR CENTRIFUGAL SKIMMING OF WHEY

(75) Inventor: Karl-Heinz Zettier, Oelde (DE)

(73) Assignee: Westfalia Separator AG, Oelde (JP)

( * ) Notice: Subject to any disclaimer, the term of this patent is extended or adjusted under 35 U.S.C. 154(b) by 0 days.

(21) Appl. No.: 09/623,312

(22) PCT Filed: Mar. 25, 1999

(86) PCT No.: PCT/EP99/02022

§ 371 (c)(1),
(2), (4) Date: Aug. 31, 2000

(87) PCT Pub. No.: WO99/57988

PCT Pub. Date: Nov. 18, 1999

(30) Foreign Application Priority Data

May 9, 1998 (DE) .......................................... 198 20 870

(51) Int. Cl.$^7$ .............................. A23P 1/00; A23C 1/00
(52) U.S. Cl. ......................... 426/491; 426/490; 99/452; 210/513
(58) Field of Search ................................. 426/491, 490, 426/478, 580, 583, 586; 99/452, 456; 210/513, 514, 515

(56) References Cited

U.S. PATENT DOCUMENTS 3,703,983 A * 11/1972 Tholl
3,893,894 A * 7/1975 Humiston
4,617,861 A * 10/1986 Armstrong

OTHER PUBLICATIONS

Hanno–R. Lehmann, Karl–Heinz Zettier, *Whey Processing Lines*, Technical–scientific documentation No. 6, Third revised edition 1988, Published by Westfalia Separator AG.

Dipl.–ling. Heinz Hemfort, "Separatoren Zentrifugen für Klärung, Trennung, Extraktion, Erste Auflage", 1979.

* cited by examiner

*Primary Examiner*—Leslie Wong
(74) *Attorney, Agent, or Firm*—Barnes & Thornburg

(57) ABSTRACT

The aim of the invention is to provide a method for the skimming of whey, resulting in better whey cream fat quality and allowing for automatic regulation of the concentration of whey cream. Raw whey is fed into a skimming separator and broken down into a skimmed whey phase and a whey cream phase. Whey cream is discharged through a discharge line and a part thereof corresponding to 0.5–2% of the volumetric flow of the raw whey that is fed into the skimming separator is returned to the feed line of the skimming separator by means of a recirculating device. A density transmitter can be arranged in the recirculating device so that density measurements can be carried out. The density values are transmitted to an evaluation device, enabling regulation of a control valve which is placed in the whey cream discharge line. The method and device for implementing the method are used in the processing of whey which is produced during the production of cheese after the cheese has been separated from the fat during the coagulation of the milk.

3 Claims, 2 Drawing Sheets

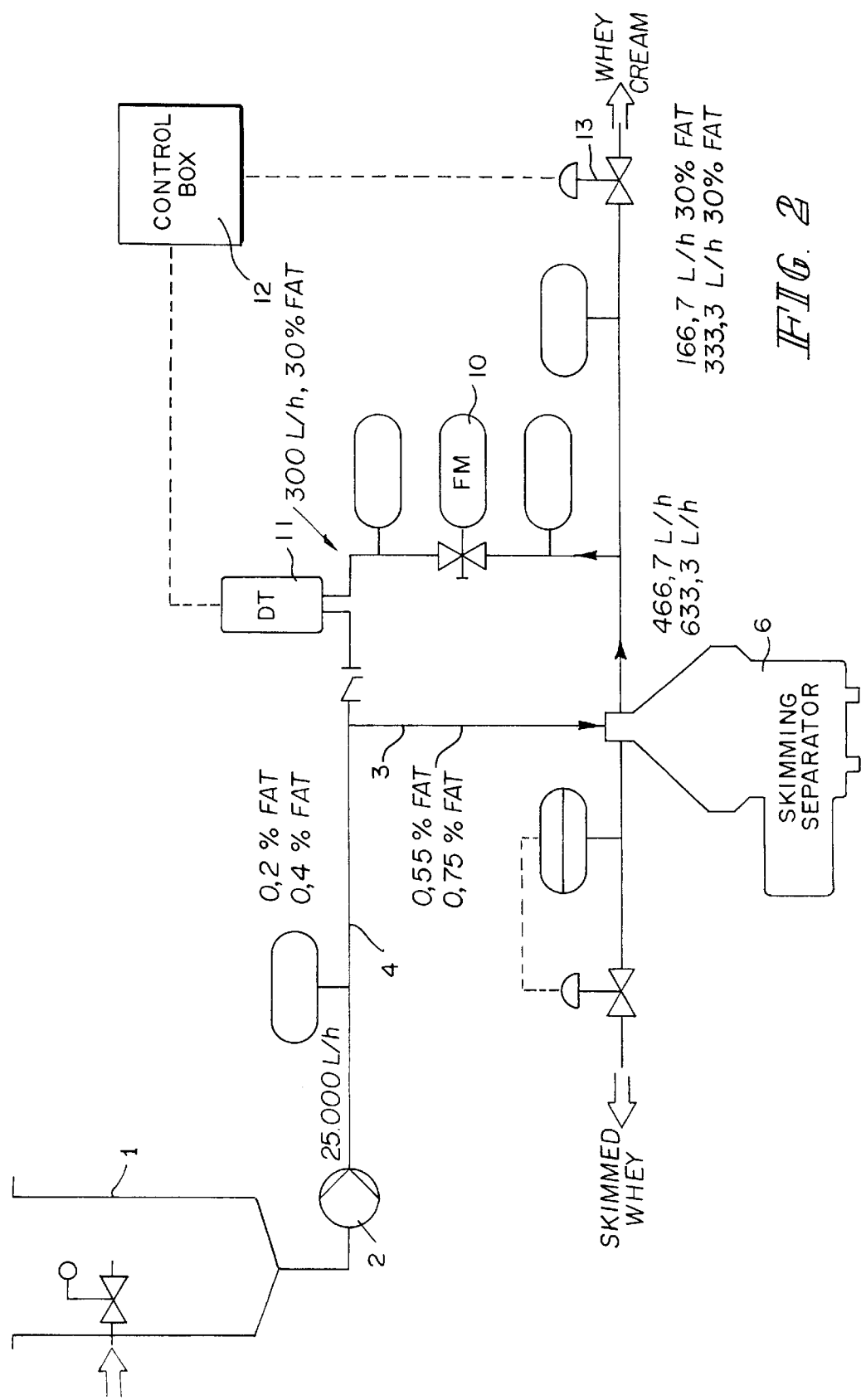

METHOD AND DEVICE FOR CENTRIFUGAL SKIMMING OF WHEY

BACKGROUND AND SUMMARY OF INVENTION

The invention relates to a method and a device for the centrifugal skimming of whey in which raw whey is fed to a feeding device of a skimming separator and is broken down into a skimmed whey phase and into a whey cream phase. Discharge devices then expel this from the skimming separator.

The concentration of the whey cream is adjusted by a control valve provided in the whey cream discharge line. The raw whey is the liquid resulting from the production of cheese after the separation of the case in and of the fat when the milk curdles.

The fat content of the raw whey to be skimmed, as a rule, is relatively low: approximately 0.1 to 0.2 percent. In contrast, the whey cream flowing out of the skimming separator has approximately 30% fat content. This results in a cream quantity which, in the least favorable case, corresponds to only 1/300 of the fed raw whey. In the case of such a low cream quantity, only a low flow rate is achieved in the skimming separator. At low flow rates, a minimal disturbance, such as a burst of air, may interrupt the cream flow and thus impair the skimming intensity of the skimming separator. In addition, the cream can form oil at this low flow rate.

Another disturbance factor is the very different fat content in the raw whey which can change from one cheese producer to another cheese producer abruptly within the above-mentioned values of from 0.1 to 0.4%. This means that the quantities flowing from the whey cream discharge line can change by the factor 4. Because of the relatively small whey quantity and the potential for abrupt change of this quantity, automatic regulation of the concentration has not been used successfully.

It is an object of the invention to provide a process for the centrifugal skimming of whey which not only provides a better fat quality of the cream but also permits automatic regulation of the cream concentration. In addition, a device is to be designed for implementing this method.

According to the invention, a quantity of whey cream is returned via a recirculation line into the feed line of the skimming separator; it is found that a quantity of 0.5 to 2 percent of the volumetric flow of the raw whey fed to the skimming separator is best.

In a preferred embodiment of the method according to the invention, in the recirculation line a constant volumetric flow with constant pressure conditions is adjusted and density measurements are transmitted to an evaluation device which regulates the control valve in the whey cream discharge line.

The device for implementing the method according to the invention has a skimming separator having a feed line for raw whey and discharge lines for skimmed whey and whey cream. From the whey cream discharge line, a recirculation line branches off, allowing a portion of the whey cream into the feed line for the raw whey. A fluidimeter and a density transmitter are placed in the recirculation line, and connected with an evaluation device which can selectively operate the control valve in the whey cream discharge line.

The method according to the invention and the device required for implementing the method are described in detail by means of FIGS. 1 and 2.

BRIEF DESCRIPTION OF DRAWINGS

FIG. 2 is a view of an embodiment by showing the volumetric flows and the pertaining fat contents in the various lines.

DETAILED DESCRIPTION OF PREFERRED EMBODIMENTS

Figure 1:
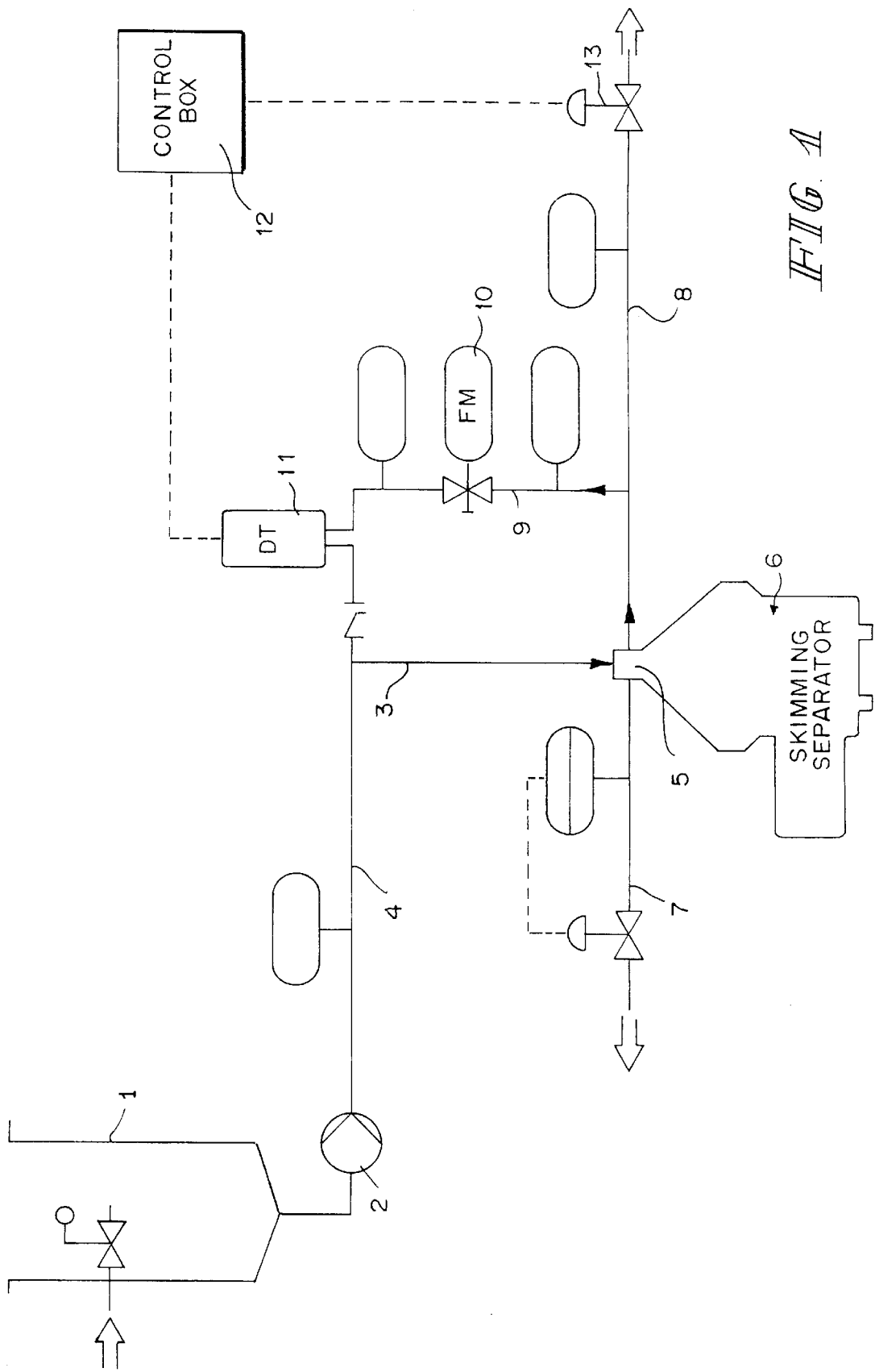
FIG. 1 is a flow chart for the raw whey and for the phases obtained from the raw whey and shows the device parts required for the implementation of the method.

Raw whey is fed to a container 1 from which it is expelled by a pump 2 and fed to a feed line 3 by way of a delivery line 4. The feed line 3 leads into the feeding device 5 of a skimming separator 6. In the skimming separator 6, the raw whey is broken down into the "skimmed whey" and "whey cream" phases. The skimmed whey is discharged by way of a discharge line 7 and the whey cream is discharged by way of a separate discharge line 8.

A quantity of whey cream is recirculated by a recirculation line 9 into the feed line 3. A fluidimeter 10 and a density transmitter 11 are arranged in the recirculation line 9. The density transmitter is connected to an evaluation device, which is arranged in a control box 12. This evaluation device adjusts a control valve 13 in the whey cream discharge line 8.

FIG. 2 illustrates an embodiment in which the volumetric flow of the raw whey amounts to 25,000 liters per hour expelled from the container 1 by the pump 2 and is fed to the feed line 3. The fat content of this raw whey fluctuates between 0.2 and 0.4 percent. This results in a volumetric flow on the cream side of the skimming separator 6 which may fluctuate between 166.7 and 333.3 liters per hour. Thus, without a recirculation of whey cream, the fat content of the whey going into the skimming separator may vary by 100 percent. Such a pronounced fluctuation leads to the above-mentioned problems and requires spontaneous manual interventions in the adjustment of the separator.

Assuming a flow rate of 300 liters per hour of whey cream through the recirculation line 9 into the feed line 3, a fat quantity between 0.55 percent and 0.75 percent occurs in the input of the skimming separator, which amounts to a variation of only 36 percent. In addition, a cream quantity flows in the skimming separator 6 which is increased by the recirculated amount of 300 liters per hour. The flow rate therefore may be doubled, or even more.

In the recirculation line 9, a constant volumetric flow can be adjusted which has constant pressure conditions. The density transmitter 11 determines the density of the flow in the recirculation line and transmits the value to an evaluation device in the control box 12. The control valve 13 is arranged in the discharge line 8 for the whey cream.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. A method for the centrifugal skimming of raw whey, comprising the following steps:

feeding a volumetric flow of the raw whey into a feeding device of a skimming separator;

breaking down the raw whey into a skimmed whey phase and a whey cream phase;

discharging each phase from the skimming separator by way of respective discharge devices;

connecting each respective discharge device to a respective discharge line;

arranging a control valve in the whey cream discharge line;

recirculating a portion of whey cream from the whey cream discharge line into feeding device of the skimming separator;

wherein, the portion is 0.5 to 2 percent of the volumetric flow.

2. The method according to claim 1, further comprising the steps of providing a density transmitter in the recirculation line;

arranging the density transmitter to be in communication with an evaluation device;

placing the evaluation device in communication with the control valve; and, selectively operating the control valve by means of the evaluation device in order to maintain a relatively constant volumetric flow and relatively constant flow pressure of whey cream in the discharge line.

3. A device for centrifugal skimming of whey, comprising:

a feed line directing raw whey into a skimming separator;

a discharge device for skimmed whey;

a discharge device for whey cream;

a respective discharge line for each of the discharge devices;

a recirculation line receiving a portion whey cream and branching off the whey cream discharge line and leading into the feed line;

a control valve in the whey cream discharge line;

a fluidimeter positioned in the recirculation line;

a density transmitter in the whey recirculation line; and, an evaluation device in communication with the density transmitter and the control valve in order to adjust the volumetric flow of whey cream.

* * * * *